United States Patent [19]
Osder

[11] Patent Number: 5,012,423
[45] Date of Patent: Apr. 30, 1991

[54] BACK-UP FLY BY WIRE CONTROL SYSTEM

[75] Inventor: Stephen S. Osder, Scottsdale, Ariz.

[73] Assignee: McDonnell Douglas Corporation, Long Beach, Calif.

[21] Appl. No.: 338,624

[22] Filed: Apr. 17, 1989

[51] Int. Cl.⁵ .............................................. B64C 13/16
[52] U.S. Cl. .................................. 364/432; 244/17.13; 244/196; 73/178 H; 73/178 R
[58] Field of Search ............. 364/432, 434; 73/178 H, 73/178 R; 244/17.13, 196

[56] References Cited

U.S. PATENT DOCUMENTS

| | | | |
|---|---|---|---|
| 4,236,685 | 12/1980 | Kissel | 244/196 |
| 4,527,242 | 7/1985 | McElreath et al. | 364/432 |
| 4,676,460 | 6/1987 | Hagy et al. | 364/432 |
| 4,740,899 | 4/1988 | McElreath | 364/432 |
| 4,741,501 | 5/1988 | Clelford et al. | 244/17.13 |
| 4,758,958 | 7/1988 | von Gersdorff | 244/13.13 |

Primary Examiner—Parshotam S. Lall
Assistant Examiner—Tyrone Queen
Attorney, Agent, or Firm—Curt L. Harrington; Gregory A. Cone; John P. Scholl

[57] ABSTRACT

A device and method of back-up fly by wire control, especially useful in fly by wire systems when a failure mode is encountered. The problem of back-up system controllability with the type of compliant sidestick which has minimal displacement and returns to zero upon release of the control force is solved by reducing the authority of the sidestick to a fraction of full authority actuator position capability, to provide good control sensitivity. Full authority actuator position control is provided by automatically activating a trim integrator when the sidestick reaches its displacement stops.

26 Claims, 2 Drawing Sheets

BACK-UP FLY BY WIRE CONTROL SYSTEM

BACKGROUND OF THE INVENTION

Fly-by-wire control systems for aircraft have become increasingly prevalent as the accuracy and reliability of the processes of control have been extended by modern technology. Conventional-type backup controls add too much weight to the aircraft Therefore, a fly-by-wire backup, compatible with the main fly-by wire system becomes a necessity.

Past flight control devices, whether usable as a backup to a fly-by-wire system or not, include Soviet Patent No. 648,940 to A. I. Nikolaichenko entitled "Nonlinear Automatic Control System," which discloses a control scheme including an amplifier, differentiator, relay switch and comparator to produce a variable control when the actual error is greater than the set error and a linear control when the actual error is less than the set error.

U.S. Pat. No. 4,642,774 to Centala, et al, entitled "Automatic Flight Control with Pilot Fly Through" discloses a device which allows pilot deviation from a predetermined flight path and has a fading circuit to facilitate a default control scheme to the predetermined flight path once pilot intervention has ceased.

U.S. Pat. No 4,667,909 to Curci, entitled "Single Stick Control System for Helicopters" discloses a mechanical apparatus providing for manipulation of a single stick to effect directional flight, vertical flight and autorotation in the case of sudden power failure in flight. U.S. Pat. 4,696,445 to Wright, et al, entitled "Collective Control System for a Helicopter" discloses a circuit for transition of control between a force type stick and a displacement type stick to facilitate smooth transition therebetween.

U.S. Pat. No. 3,995,205 to Klees, entitled "Vehicle Maneuvering Control System" discloses a control system for use in controlling a vehicle using both manual and automatic control. U.S. Pat. No. 3,940,594 to Bleak, et al, entitled "Automatic Process Controller with Bumpless Operation" discloses a circuit for transfer between manual and automatic modes of control.

U.S. Pat. No. 2,974,908 to W. A. Platt, entitled "Closed Loop Ratio Changer and Automatic Trim Computer means for Controlling the Position of an Aircraft Control Surface" discloses a mechanical and electrical method for changing the response ratio to a surface to be controlled. U.S. Pat. No. 2,940,332 to W. D. Teague, Jr., entitled "Ratio Changer Device" discloses a mechanical method for changing the response ratio to a surface to be controlled.

U.S. Pat. No. 3,696,282 to Hirokawa, et al, entitled "Marine Autopilot System including Mode Engagement Features" discloses a comparator which generates a signal based on the differences between the set course signal and the heading signal. U.S. Pat. No. 2,859,926 to R. Westbury, entitled "Aircraft" discloses a standby mechanical linkage as a backup in the event of electrical failure.

U.S. Pat. No. 3,485,463, to R. J. Miller, entitled "Control Stick Transducer" discloses a device to provide a pair of electrical outputs, one proportional to stick displacement and the other proportional to stick position. U.S. Pat. No. 3,369,161, to L. A. Kaufman, entitled "Hard Over Attenuation Device for Servo System" discloses a device for mechanically limiting the range of movement for a servomotor.

U.S. Pat. No. 3,199,013 to Brahm, et al, entitled "Rate Responsive Compensation Change Circuit" discloses a stabilization system for a helicopter in both hover and forward flight in the yaw, pitch and roll axes. U.S. Pat. No. 3,528,633 to Knemeyer, entitled "System for Controlling and Stabilizing an Aircraft in Yaw" discloses a pilot assisted yaw control system which applies a control signal, upon pilot activation, which is proportional to the difference between the force applied and the yaw rate to thereby produce a yaw rate proportional to the applied force.

Most of the above references relate to transition "smoothing" during the changeover from one mode of control to another. Others relate to "controlling through" a given control echelon temporarily. None relate to a total failsafe backup control for fly-by-wire control failure. Problems of controllability exist in such back-up modes because there is poor position resolution in a compliant sidestick controller, and there is no method of maintaining trimmed flight other than trying to hold the stick displacement against the spring return force.

SUMMARY OF THE INVENTION

This invention involves a method for implementing a direct electrical link type of control for a helicopter or other aircraft using a compliant sidestick controller. It solves the problem of back-up system controllability with the type of compliant sidestick which has minimal displacement and returns to zero upon release of the control force.

The sidestick controller may be of the 2, 3, or 4 axis type. The system described is for a back-up rather than primary fly-by-wire system because compliant sidestick controllers are generally used for fly-by-wire systems in which the stick control inputs command rates of change of aircraft states, such as attitude or velocity. In such primary fly-by-wire systems, measurements of the aircraft attitude rates, linear velocities and/or accelerations are needed to close loops on the stick commands to achieve the desired aircraft response.

This invention addresses the back-up control which must be activated if all of the aircraft motion sensors have failed or if the control computers have shutdown. The backup control must position the flight control actuators directly from signals derived from the sidestick controllers. Tests were made to evaluate such a direct electrical link back-up control mode using a compliant sidestick. The evaluation was done in the simulator. The conclusion was that the aircraft could not be safely flown in the direct electrical link mode. The present invention solves this back-up mode controllability problem by overcoming its poor position resolution in a compliant sidestick controller and maintaining trimmed flight. This invention describes techniques used to give such a mode acceptable flying qualities.

The Advanced Apache and LHX (light helicopter) flight control systems used baseline fly-by-wire systems that include compliant sidestick controllers. Both of these systems as well as most contemporary fly-by-wire systems make provision for a back-up direct electrical link mode. This invention describes techniques which compensate for the small displacement motion of these compliant controllers. If the full throw of the sidestick, equivalent to full control authority, were attempted to be built into the control actuators, the sensitivity of the stick would be too high for good aircraft control capability. Moreover, the high sensitivity makes the problem of holding a non-zero trim point while simultaneously providing aircraft stabilizing commands extremely difficult to a degree approaching impossibility.

For example, U.S. Pat. No. 4,420,808, to Diamond, et al, uses proportional plus integral control with a force stick (no displacement) as its solution to this problem. In such a design, trim is maintained by the integral part of the control law. While our evaluation of direct link control laws found that integral control would be acceptable in a highly stable aircraft, we have discovered that it is not considered satisfactory for managing a helicopter's stability characteristics. An integral type of control law makes the actuator rate proportional to the control input, but acceptable flying qualities require that the actuator position be proportional to the pilot's command.

The invention described herein solves the problem by reducing the authority of the sidestick to a fraction of full authority actuator position capability, thereby providing good control sensitivity. It provides a means for full authority actuator position control by automatically activating a trim integrator when the sidestick reaches its displacement stops. It provides a means for manual trim capability when the stick is in its normal linear control range through the activation of a single trim push-button for all control axes of the aircraft. That manual trim function does not require trim polarity control since depressing the push-button will automatically determine the correct trim polarity needed to return the sidestick controller to its zero force (or detent) position.

The system works with both analog and digital mechanizations. In the Advanced Apache Fly-By-Wire system design, it is implementable in the digital computers as the direct link back-up mode for the event of total loss of all redundant inertial attitude rate sensors. It is also mechanized in analog circuits for the case where all of the redundant digital computers have shutdown. In this latter case, we refer to the function as Analog Back-up or ABU. The mechanism of the ABU will be described below, but all summations and integrations are also performed digitally (in software) for the direct link mode.

BRIEF DESCRIPTION OF THE DRAWINGS

The structure and method of operation of the invention, together with additional advantages thereof, will be best understood from the following description of specific embodiments when read in connection with the accompanying drawings in which.

DETAILED DESCRIPTION OF THE PREFERRED EMBODIMENT

Figure 1:
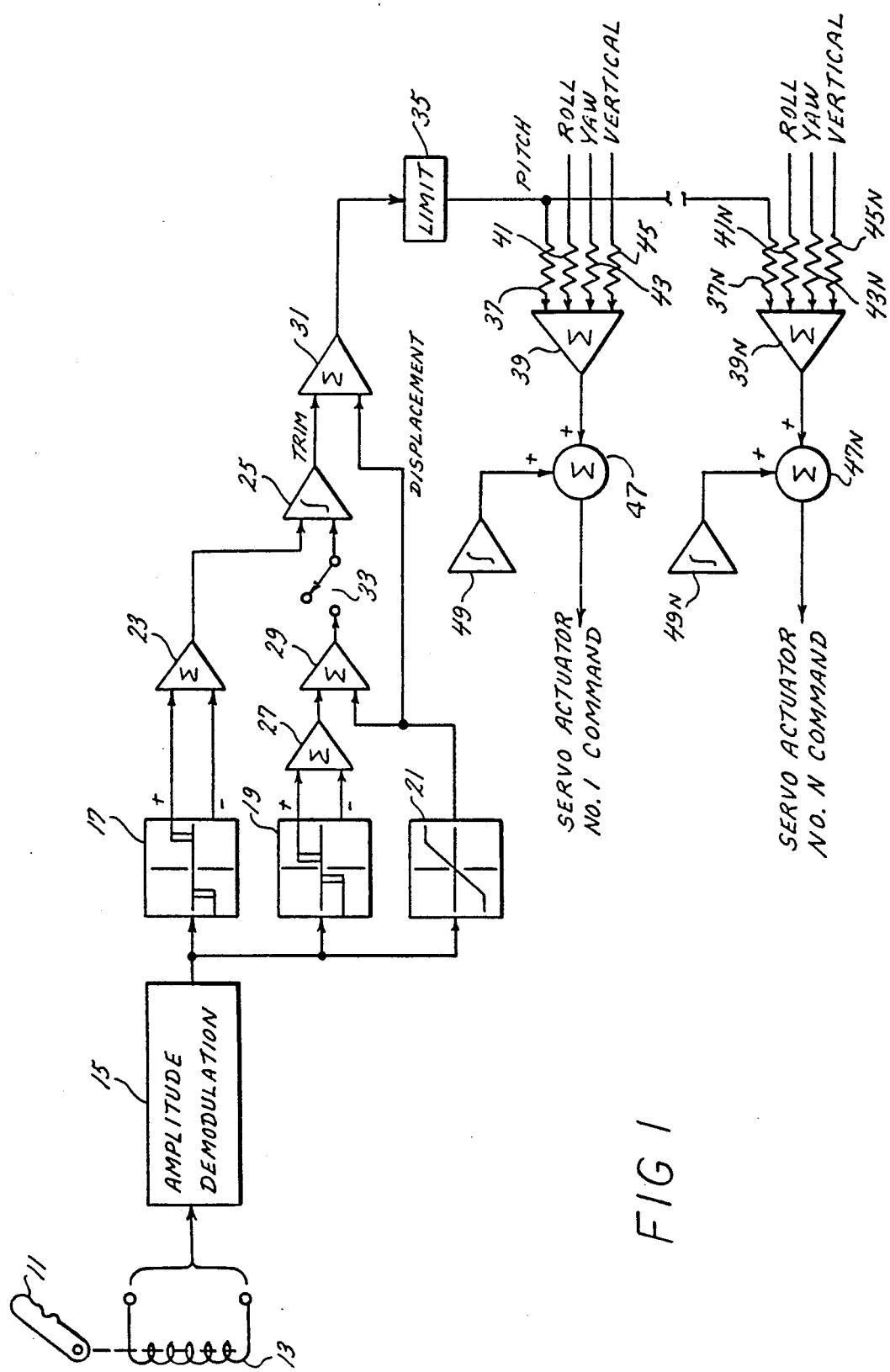
FIG. 1 is a general control flow schematic of the device and method of the present invention.; and, FIG. 2 is illustrates the integration of the latter stages of control shown in FIG. 1 into the main fly-by-wire scheme of a typical aircraft.

Referring to the FIG. 1, the following discussion will describe implementation of the invention in terms of the pitch control on an aircraft. The implementation for the roll, yaw, and vertical is the same as for the pitch implementation described herein, and a description of the other implementations will be omitted. A control stick 11, is used to effect a pilot initiated pitch command, and is linked to what may be generically termed a stick displacement transducer 13. Transducer 13 may be a linear variable displacement transformer. Transducer 13 converts the angular position of stick 11 into an electrical signal. Transducer 13 is electrically connected to an amplifier-demodulation block 15. Amplifier-Demodulator block 15 is connected in parallel to a fast automatic trim transfer block 17, a vernier trim transfer block 19, and a linear vernier control block 21.

Fast automatic trim transfer block 17 provides a positive output when the limit of stick 11 "bumps" the edge of its positive control limit, and a negative output when the limit of stick 11 "bumps" the edge of its negative control limit. In between those limits, as is shown on FIG. 1, there is no output.

Fast automatic trim transfer block 17 is electrically connected to a summing operational amplifier 23, via both the positive and negative output of block 17. The output of summing operational amplifier 23 is connected to one input of an integrator 25.

Vernier trim transfer block 19, as is shown in FIG. 1, provides a positive output when stick 11 exceeds a narrow positive limit and provides a negative output when stick 11 exceeds a narrow negative limit. The term narrow relates generally to the magnitude with respect to the limit of fast automatic trim transfer block 17, and can be freely specified by the user. Vernier trim transfer block 19 is electrically connected to a summing operational amplifier 27 via both the positive and negative output of vernier trim transfer block 19. The output of summing operational amplifier 27 is connected to one input of a summing operational amplifier 29.

Linear vernier control block 21 provides an output proportional to the position of stick 11. Generally, the limits of the linear output will extend to a point very near the limit of mechanical motion of stick 11. The output of linear vernier control block 21 is provided to a second input of summing operational amplifier 29. The output of linear vernier control block 21 is also provided to one input of a summing operational amplifier 31. The other input of summing operational amplifier 31 is connected to the output of integrator 25.

A switch 33 switchably controls the electrical connection between the output of summing operational amplifier 29 and one input of integrator 25. Switch 33 is typically controlled by a pilot when he actuates a trim button (switch), and the trim button or actuator (not shown) for switch 33 may be located upon stick 11.

The output of summing operational amplifier 31 is connected to a limit control block 35. Limit control block 35 limits the command signal to a signal level that corresponds to the maximum control authority of the flight control actuators. In helicopters, those actuators will be driving a main rotor swashplate displacement (typically). In a fixed wing aircraft, those actuators will drive control surfaces.

The system described to this point was nominally indicated as the pitch control system. It could have just as easily been the roll, yaw, or vertical control system. In the duplication of the system up to this point, a limit control block 35 would probably exist separately for each of the pitch, roll, yaw, and vertical systems of control. For pitch control, the output of limit control block 35 is shown connected, through an input resistor 37, to one input of a summing operational amplifier 39. Three other inputs into operational are also shown, with their respective input resistors 41, 43, and 45. These other three inputs extend from the roll, yaw, and vertical control systems which are a duplicate of the pitch control system described in the bulk of FIG. 1 The input resistors 37, 41, 43, and 45 are used to selectively "mix" the pitch, roll, yaw and vertical inputs into summing operational amplifier 39.

So, the four inputs of summing operational amplifier 39 are summed to provide control to one of the helicopter swash plate positions or to one of the control surfaces of the aircraft. In some applications, the control surface commands will be reduced to their most elemental control signals as in the case of the decoupling matrix disclosed in U.S. Pat. No. 286,235 entitled "Automated Helicopter Flight Control System," inventors Osder and Caldwell, assigned to the assignee of the present application. The selective mixing method described herein is performed in lieu of the decoupling matrix described in the above application.

The output of summing operational amplifier 39 is intended to serve a single control actuator. In a helicopter, generally, the yaw, or directional control is the paramount input to the tail rotor servo, while the pitch, roll and vertical inputs, and the manner of their mixing, are paramount to the swash plate and cyclic servos. Nevertheless, the summing operational amplifier 39 is shown with all inputs attached to illustrate that some cross control can be utilized among all of the controls.

The output of summing operational amplifier 39 is connected to a summing junction 47. A synchronizing position integrator 49 has an output also connected to summing junction 47. The output of summing junction 47 provides a signal which is the sum of the current control signal magnitude and the value of actuator position that existed when back-up control was initiated which is sum of past control signal magnitudes.

Figure 2:
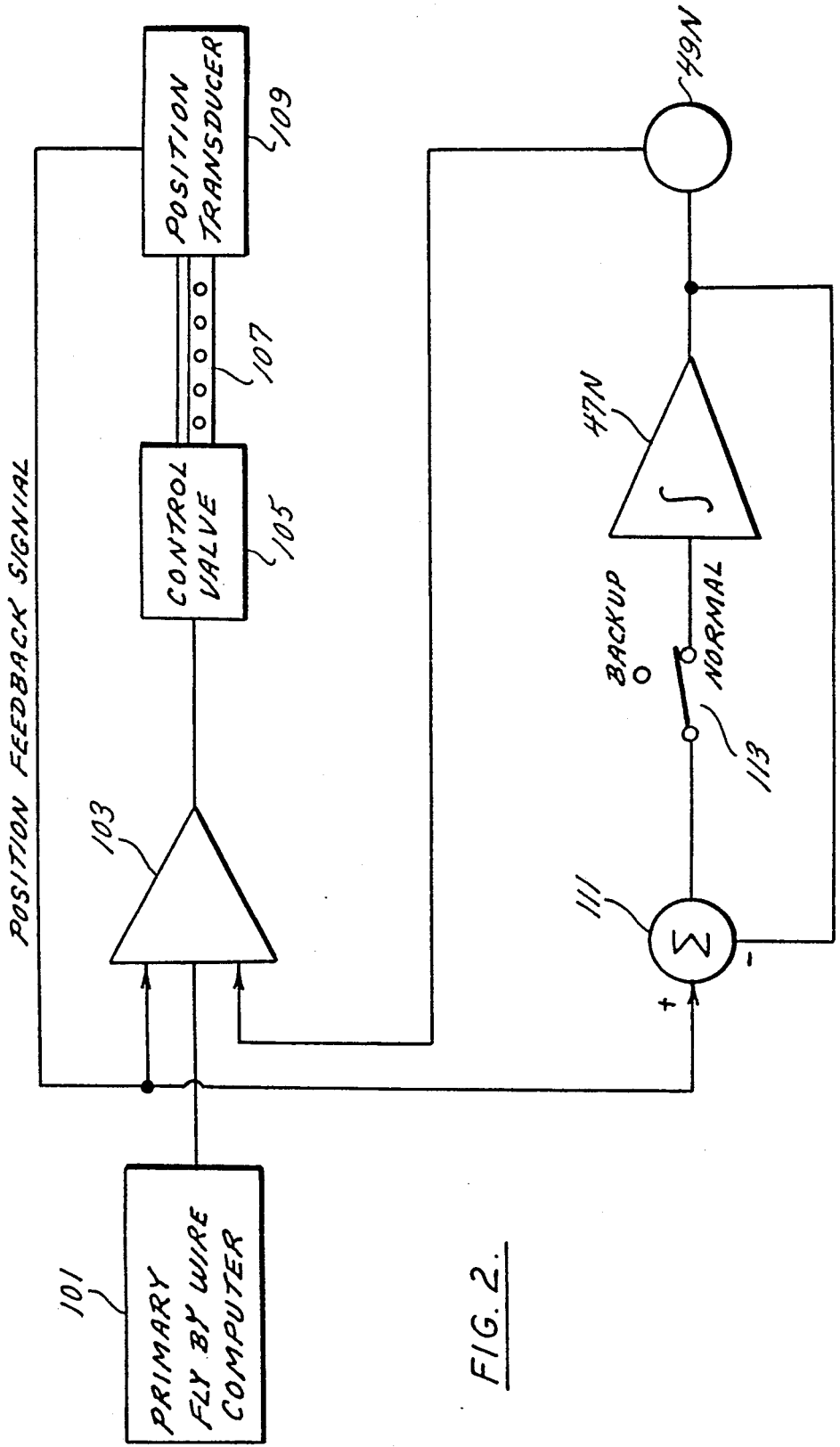

Referring to FIG. 2, a primary fly-by-wire computer 101 is connected to one of three inputs of a servo amplifier 103. The output of servo amplifier 103 is connected to a control valve 105. Control valve 105 is connected to a mechanical linkage 107 which is movably controlled by control valve 105. A position transducer 109 is associated with mechanical linkage 107 and generates a signal indicative of the mechanical position of position transducer 107. The position transducer 109 is electrically connected to an input of servo amplifier 103 and to a summing junction 111. The output of summing junction 111 is connected to a one end of a switch 113. The other end of switch 113 is connected to the input of synchronizing position integrator 49N which was previously illustrated in FIG. 1. One output of synchronizing position integrator 49N is fed back and negatively summed at summing junction 111. The other output of synchronizing position integrator 49N is connected to summing junction 47N as was previously shown on FIG. 1.

Synchronizing position integrator 49N serves as the "memory" of the control valve 105 and mechanical link 107 position which existed at the instant the back-up control described herein is initiated. Initiation of the back-up control procedure causes switch 113 to be switched to the open position so that it will discontinue being updated by the signal from position transducer 109.

Referring to FIG. 1, the back-up control output is the output of summing operational amplifier 39. The output of summing junction 47 is labeled servo actuator No. 1 command while the output of summing junction 47N is labeled servo actuator No. N command. It is therefore understood that this servo could be any servo found upon any device, especially a helicopter, and that the identity of the servo as a proper provider of action in the system will be governed by the particular "mix" of resistances at summing operational amplifier 39.

For clarity, the Nth summing operational amplifier 39N is shown connected to an additional summing junction 47N, which is also fed by an additional synchronizing integrator 49N. The output of summing junction 47N is labeled servo actuator No. "N" command. The N designation in the FIGURE indicates that additional servo command feeds can be accommodated by additional mixtures of the four incoming signals.

The typical parameters of operation of the invention are as follows. Referring to FIG. 2, once the backup protocol is received through any of several possible failure indicators (not shown), switch 113 switches summing junction 111 out of connection with the input of synchronizing integrator 49N. Referring to FIG. 1, the back-up mechanism, which may be either analog or digital, is activated. For one control axis, in this case the pitch axis, the mechanism is illustrated from mechanical actuation in stick 11 through to the interface with the servo mixing stages of summing operational amplifiers 39 . . . 39N. Operational amplifiers 39 . . . 39N form a representative input to each of the servo amplifier stages for, in the case of a helicopter, the main rotor and tail rotor actuators.

Consider the case of a back-up engagement with a nose up pitch transient occurring simultaneously. For example, assume that the pilot's control requirement for the equivalent of the longitudinal cyclic actuator is 60% of full down authority. He drives the stick 11 pitch control to the mechanical limit of stick 11, known as the stops, thus immediately generating 20% of a hardover nose down command. The fast automatic trim transfer block 17 activates and adds 25% full authority per second to the trim channel of integrator 25 of the pitch axis. In 1.6 seconds, the combination of the displacement channel into summing operational amplifier 31 from linear vernier control block 21 (20%) and the integral channel from integrator 25 (40%) reaches the desired 60% cyclic control.

When the pilot begins to move the stick back toward zero, he causes actuation of switch 33, by depressing a trim button (not shown). The integral channel signal into summing operational amplifier 31 increases the nose down command above the existing value of 40% at a rate proportional to the stick 11 displacement plus a fixed trim rate set within vernier trim transfer block 19. For purposes of illustration we will consider this limit to be set to 5% per second. In order to keep the nose from falling, the pilot returns stick 11 "backward" toward zero. The effect of the trim off-load action disappears as the stick approaches zero and falls into the trim detector deadzone.

The FIGURE illustrates that, in control terms, the pitch axis output from summing operational amplifier 31 is the sum of the stick displacement signal from linear vernier control block 21, plus the trim integral signal from integrator 25. That sum is the equivalent of the pitch cyclic command which is, after appropriate limitation in limit block 35, then applied through the proper weighting resistors 37, 41, 43, and 45 to the actuator servo amplifiers indicated as servo actuator No. 1 through servo actuator No. N. In the case of the helicopter, there are three main servos plus the tail rotor.. The reference position of each actuator upon engagement of the back-up control of FIG. 1 is held by the integrator 49 . . . 49N, which act as actuator position synchronizers. The drift of integrator 49 should be considerably less than 1.0% full authority per second. This easily achieved drift specification will not impose any serious flying quality challenges.

Nominally, for helicopters an allocation of ±20% of full authority to full throw of the stick in each control axis will work well. If stick 11 is against a limit, above the 20% authority limit, the command automatically off-loads via fast automatic trim transfer block 17, into integrator 25 at a gain of, perhaps, 25% full authority/second. As the pilot relaxes the command so that it falls below the ±20% limits, the automatic off-loadin9 via fast automatic trim transfer block 17, into integrator 25 will cease. The pilot now has "fine control" within the linear range of the stick transducer 13.

Next, if the pilot wishes to return the stick to the zero position while maintaining trim attitude, he engages a switch 33 not only for the pitch axis, but all axes. When the switch 33 is engaged, off-loading to the trim integrator 25 again occurs, but this time at a much slower rate. This maximum rate would be, for example, 10% full authority per second reducing toward zero as the pilot moves the stick toward the zero or detent position to compensate for the command being generated by the integrator channel.

Ideally a switch 33 should be activated by a trim push button device rather than a conventional 2-polarity trim switch device because the correct trimming polarity is automatically determined by the control law. The adaptive trim rate procedure provided by a fixed rate derived from vernier trim transfer block 19 and a rate proportional to stick displacement from its null position derived from linear vernier control block 21 minimizes the complexity of managing the stick in all 4-axes and makes it easier to keep up with a simultaneous trim in all control axes proportional to the amount of stick displacement to be trimmed.

The nominal trim equation is:

$$TRIM = \ldots TRIM(0) + A(K_1 + K_2\ DISPL)\ dt$$

where TRIM=Trim Integrator Output (in % full authority units)

TRIM(0)=Initial Output of Integrator before start of trim $K_1$ is which can range from 0 to 1.00, but is ideally about 0.05, which will cause the trim equation of generate an utput even if a trim button is activated with zero displacement (DISPL) on the stick.

$K_2$ is a second constant which can also range from 0 to 1.0 but typically is on the order of from 0.10 to 0.50 which causes an increase in the magnitude of the TRIM signal in constant proportion to the magnitude of $K_2$ times the instantaneous value of the stick displacement (DISPL) during the times when the trim button is activated.

A=logic Status of Trim Button, which equals
1.0 for button depressed
0.0 for button not depressed DISP=Stick displacement in axis of interest in % of full control authority. . . . Thus if Stick is limited to 20% full authority, and stick is at displacement limit, DISPL will be 0.2 dt=the differential passage of time. This causes the duration of engagement of the trim button to increase the TRIM signal.

According to the above equation, if the stick displacement is ¾ full throw=(¾)(20%)=0.15, the trim rate, TRIM will be:

0.05+0.15=20% per second, if trim button is depressed.

If the stick displacement is now reduced to 10% of full stick throw, then DISPL will=(0.1)(20%)=0.02, then the trim rate, when activated will set TRIM=0.05+0.02=0.07 or 7% full authority per second. Thus the trimming action fine vernier as the stick approaches zero displacement.

Note that the polarity of the 0.05 term in the TRIM equation is always made to be the same polarity of DISPL. It is understood that the rates recited above can be adjusted to any level, and that the rates recited are for purposes of illustration.

The forgoing disclosure and description of the invention are illustrative and explanatory thereof, and various changes in the mode of implementation of the control scheme, and variations thereon, types of control,(e.g., electrical, mechanical, pneumatic, etc.) as well as in the details of the illustrated embodiments may be made without departing from the spirit and scope of the invention.

What is claimed is:

1. A back-up fly by wire control system comprising:
   input control means for controlling at least on flight characteristic of an aircraft;
   linear transmission means, connected to and responsive to said input control means, for generating an output proportional to the degree of input control applied to said input control means;
   first step transmission means, connected to and responsive to said input control means, for generating a constant output when said input control means is set to the magnitude limit of its control, said constant output having a polarity indicative of the polarity of said limit, and for generating no output when said input control means is set to less than a maximum limit of control;
   second step transmission means, connected to and responsive to said input control means, for generating a constant output rate when said output control means exceeds a prespecified limit of control said constant output rate having a polarity indicative of the polarity of said prespecified limit, and for generating no output when said input control means is set to less than said prespecified limit of control;
   limitation means for limiting the amplitude of a control signal;
   control coupling means, connected to said linear transmission means, said first and said second step transmission means, and said limitation means for constantly coupling said linear transmission means and said first step transmission means to said limitation means, and for switchably coupling said second step transmission means to said limitation means; and,
   selective actuator means, connected to said limitation means, for weighting control signals received from said control means, summing said weighted control signals with a time integral position signal, and acting upon said summed weighted control signals.

2. The back-up fly-by-wire control system of claim 1 wherein said input control means further comprises:
   mechanical pilot input means for indicating pilot specified flight control commands; and, transduction means, connected to said mechanical pilot input means for converting the mechanical displacement of said mechanical pilot input means to an electrical signal.

3. The back-up fly-by-wire control system of claim 2 wherein said transduction means is a linear displacement transducer.

4. The back-up fly-by-wire control system of claim 2 wherein said mechanical pilot input means is a small travel displacement sidestick.

5. The back-up fly-by-wire control system of claim 2 wherein said mechanical pilot input means is a small displacement force stick.

6. The back-up fly-by-wire control system of claim 1 wherein said input control means has a displacement authority of approximately 20 percent of full authority.

7. The back-up fly-by-wire control system of claim 1 wherein the prespecified limit at which said second step transmission means generates a constant output rate is approximately 25% of said linear authority of said input control means.

8. The back-up fly-by-wire control system of claim 1 wherein said control coupling means further comprises:
a first summing means for summing an input signal, having at least one input and an output, said input electrically connected to said linear transmission means;
a second summing means summing an input signal having at least one input and an output, said input electrically connected to said first step transmission means;
a third summing means for summing an input signal having at least one input and an output, said input of said third summing means electrically connected to said output of said second summing means and to said second step transmission means;
a switch having a first end connected to said output of said third summing means, and a second end;
a first integrator having at least one input and an output, said input of said integrator connected to said second end of said switch and to said output of said first summing means; and,
a fourth summing means for summing an input signal having at least one input and an output, said input of said fourth summing operational amplifier electrically connected to said output of said first integrating operational amplifier and to said linear transmission means, said output of said fourth summing operational amplifier connected to said limitation means.

9. The back-up fly-by-wire control system of claim 1 wherein said selective actuator means further comprises:
at least one weighting resistor having one end connected to said limitation means, and an other end;
at least one summing actuator operational amplifier having at least one input connected to said weighting resistor;
a synchronizing position integrator means, having an output, for providing an output signal which is the memory of past control signals to the actuator;
a summing junction having a first input connected to said output of said synchronizing position integrator means, a second input connected to said output of said summing actuator operational amplifier, and an output.

10. The back-up fly-by-wire Control system of claim 9 further comprising an actuator connected to the output of said summing junction.

11. In an aircraft having multiple control axes, the back-up fly-by-wire control system of claim 1 wherein at least one linear transmission means, at least one first step transmission means, at least one second step transmission means, at least one control coupling means, and at least one limitation means exists for each axis to be controlled.

12. The back-up fly-by-wire control system of claim 1 implemented using a digital computer.

13. The back-up fly-by-wire control system of claim 1 implemented using analog electronics.

14. The back-up fly-by-wire control system of claim 1 implemented using an optical control circuit.

15. A back-up fly-by-wire control system comprising:
a pilot actuatable stick;
a displacement transformer, connected to said stick;
an amplitude demodulator, electrically connected to said displacement transformer;
a linear signal generator electrically connected to said amplitude demodulator;
a first constant signal generator, electrically connected to said amplitude demodulator, set to trigger when said stick has reached the limit of its control authority;
a second constant signal generator, electrically connected to said amplitude demodulator, set to trigger when said stick has reached a prespecified level of control authority;
a first summing operational amplifier, having at least one input and an output, said input electrically connected to said first constant signal generator;
a second summing operational amplifier having at least one input and an output, said input electrically connected to said first constant signal generator;
a third summing operational amplifier having at least one input and an output, said input of said third summing operational amplifier electrically connected to said output of said second summing operational amplifier and to said second constant signal generator;
a switch having a first end connected to said output of said third summing operational amplifier, and a second end;
a first integrating operational amplifier having at least one input and an output, said input of said integrating operational amplifier connected to said second end of said switch and to said output of said first summing operational amplifier; and,
a fourth summing operational amplifier having at least one input and an output, said input of said fourth summing operational amplifier electrically connected to said output of said first integrating operational amplifier and to said linear signal generator
a limitation circuit having an input and an output, said input of said limitation circuit connected to said output of said fourth summing operational amplifier;
at least one weighting resistor having one end connected to said limitation circuit, and an other end;
at least one summing actuator operational amplifier having at least one input connected to said weighting resistor;

a synchronous position integrator, having an output, for providing an output signal which is the integral sum of past control signal magnitudes from said summing actuator operational amplifier;

a summing junction having a first input connected to said output of said synchronous position integrator, a second input connected to said output of said summing actuator operational amplifier, and an output.

16. The back-up fly-by-wire control system of claim 15 further comprising a servo actuator having an input connected to said output of said summing junction.

17. The back-up fly-by-wire control system of claim 15 wherein said stick is a small displacement stick.

18. The back-up fly-by-wire control system of claim 15 wherein said stick is a force stick.

19. The back-up fly-by-wire control system of claim 15 wherein said stick has a linear authority of approximately 20 percent of full authority.

20. The back-up fly-by-wire control system of claim 15 wherein the prespecified level at which said second constant signal generator generates a constant output is approximately 25% of said linear authority of said stick.

21. In an aircraft having multiple control axes, the back-up fly-by-wire control system of claim 1 wherein at least one amplifier demodulator, at least one linear signal generator, at least one first constant signal generator, at least one second constant signal generator, at least one first summing operational amplifier, at least one second summing operational amplifier, at least one third summing operational amplifier, at least one switch, at least one first integrating operational amplifier, at least one fourth summing operational amplifier, and at least one limitation circuit exists for each axis to be controlled.

22. The process of operating a back-up fly-by-wire control system comprising the steps of:

sensing the mechanical position of a pilot control device;

transmitting continuously, to a limitation circuit, a signal proportional to the displacement of said pilot control device;

transmitting, to a limitation circuit, the time integral of a first constant magnitude signal when the displacement of said pilot control device has reached its mechanical control limit;

transmitting, to a limitation circuit, upon pilot command, the time integral sum of (1) said signal proportional to the displacement of said pilot control device, and (2) a second constant magnitude signal generated when the displacement of said pilot control device has exceeded a preselected limit;

driving at least one actuator amplifier with the signal from said limitation circuit; and, driving an actuator with the sum of the signals from (1) said actuator amplifier, and (2) a signal which is the sum of past signals from said actuator amplifier.

23. The process of operating a back-up fly-by-wire control system as recited in claim 22 wherein the group of steps comprising said sensing the mechanical position step, said transmitting continuously a proportional signal step, said transmitting the time integral of a first constant magnitude signal step, said transmitting the time integral sum step, and said driving at least one actuator step are performed for each axis to be controlled upon an aircraft.

24. The process of operating a back-up fly-by-wire control system as recited in claim 23 wherein said steps are performed using analog controls.

25. The process of operating a back-up fly-by-wire control system as recited in claim 23 wherein said steps are performed using digitally implemented controls.

26. The process of operating a back-up fly-by-wire control system as recited in claim 22 and further comprising the step of trimming according to the following equation:

$$TRIM = \ldots TRIM(0) + A\ (K_1 + K_2\ DISPL)\ dt.$$

* * * * *